United States Patent
Fujita et al.

(10) Patent No.: US 9,521,295 B2
(45) Date of Patent: Dec. 13, 2016

(54) IMAGE FORMING APPARATUS AND IMAGE FORMING METHOD

(71) Applicants: Hayato Fujita, Kanagawa (JP); Masaaki Ishida, Kanagawa (JP); Atsufumi Omori, Kanagawa (JP); Naoto Watanabe, Kanagawa (JP); Muneaki Iwata, Kanagawa (JP)

(72) Inventors: Hayato Fujita, Kanagawa (JP); Masaaki Ishida, Kanagawa (JP); Atsufumi Omori, Kanagawa (JP); Naoto Watanabe, Kanagawa (JP); Muneaki Iwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 10 days.

(21) Appl. No.: 14/556,745

(22) Filed: Dec. 1, 2014

(65) Prior Publication Data

US 2015/0156373 A1 Jun. 4, 2015

(30) Foreign Application Priority Data

Dec. 3, 2013 (JP) ................................ 2013-249789
Feb. 19, 2014 (JP) ................................ 2014-029335

(51) Int. Cl.
G06T 5/00 (2006.01)
B41J 2/47 (2006.01)
H04N 1/40 (2006.01)
H04N 1/401 (2006.01)

(52) U.S. Cl.
CPC .......... *H04N 1/40056* (2013.01); *H04N 1/401* (2013.01); *H04N 1/40025* (2013.01)

(58) Field of Classification Search
CPC ... H04N 1/40056; H04N 1/0282; H04N 1/401

USPC .............. 347/131, 135, 143, 144, 237, 240, 247,347/251–254; 358/296, 401, 501, 3.27, 3.26

See application file for complete search history.

(56) References Cited

U.S. PATENT DOCUMENTS

| 4,905,023 | A * | 2/1990 | Suzuki ................. H04N 1/4005 347/252 |
| 6,498,617 | B1 | 12/2002 | Ishida et al. |
| 8,235,488 | B2 * | 8/2012 | Jeon ..................... B41J 2/04573 322/28 |
| 2002/0130944 | A1 | 9/2002 | Ema et al. |
| 2003/0025785 | A1 | 2/2003 | Nihei et al. |
| 2003/0067533 | A1 | 4/2003 | Omori et al. |
| 2007/0132828 | A1 | 6/2007 | Ishida et al. |
| 2008/0088893 | A1 | 4/2008 | Ishida et al. |

(Continued)

FOREIGN PATENT DOCUMENTS

| JP | 2004-354986 | 12/2004 |
| JP | 2005-193540 | 7/2005 |
| JP | 2007-190787 | 8/2007 |

*Primary Examiner* — Cheukfan Lee
(74) *Attorney, Agent, or Firm* — Oblon, McClelland, Maier & Neustadt, L.L.P.

(57) ABSTRACT

An image forming apparatus includes: a light source; and a light source control unit that supplies a pulse drive current according to image data to the light source. An amplitude of a part of the drive current corresponding to a specified pixel of the image data is larger than an amplitude of a part of the drive current corresponding to a normal pixel of the image data that is a pixel other than the specified pixel and the pulse width of the part of the drive current corresponding to the specified pixel is smaller than the pulse width of the part of the drive current corresponding to the normal pixel.

19 Claims, 21 Drawing Sheets

(56) References Cited

U.S. PATENT DOCUMENTS

| | | |
|---|---|---|
| 2008/0117943 A1* | 5/2008 | Nishiyama .......... H01S 5/06832 372/29.02 |
| 2008/0123160 A1 | 5/2008 | Omori et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0291259 A1 | 11/2008 | Nihei et al. |
| 2009/0091805 A1 | 4/2009 | Tanabe et al. |
| 2009/0174915 A1 | 7/2009 | Nihei et al. |
| 2009/0195635 A1 | 8/2009 | Ishida et al. |
| 2011/0199657 A1 | 8/2011 | Ishida et al. |
| 2011/0228037 A1 | 9/2011 | Omori et al. |
| 2012/0099165 A1 | 4/2012 | Omori et al. |
| 2012/0189328 A1 | 7/2012 | Suzuki et al. |
| 2012/0293783 A1 | 11/2012 | Ishida et al. |
| 2013/0243459 A1 | 9/2013 | Omori et al. |
| 2013/0302052 A1 | 11/2013 | Iwata et al. |
| 2014/0125751 A1* | 5/2014 | Ishikawa .......... G03G 15/04072 347/118 |
| 2014/0139603 A1 | 5/2014 | Fujita et al. |
| 2014/0176656 A1 | 6/2014 | Omori et al. |
| 2014/0268186 A1 | 9/2014 | Iwata et al. |
| 2014/0327938 A1 | 11/2014 | Ishida |
| 2014/0333940 A1 | 11/2014 | Iwata et al. |
| 2014/0333941 A1 | 11/2014 | Iwata et al. |

\* cited by examiner (A)

IMAGE DATA (B)

IMAGE DATA
(AFTER SPECIFIED PIXELS ARE EXTRACTED)

(C)

LD CONTROL SIGNAL

FIG.6A
FIG.6B
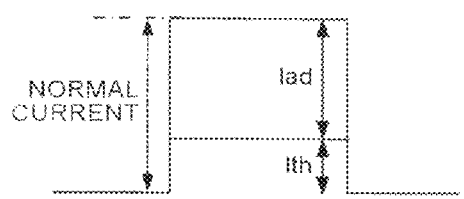
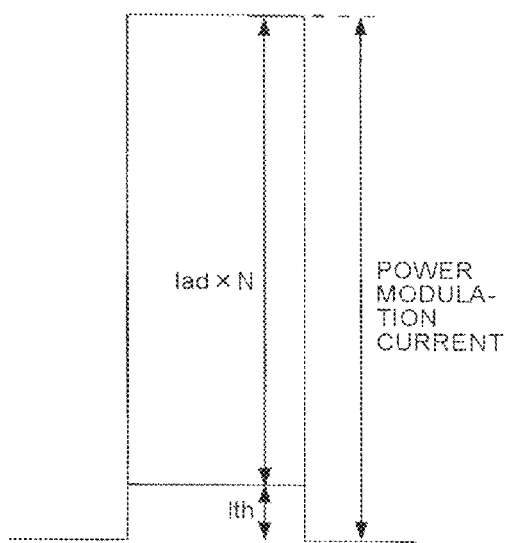

CONVENTIONAL DRIVE CURRENT WAVEFORM

DRIVE CURRENT WAVEFORM OF EXAMPLE 1

DRIVE CURRENT WAVEFORM OF EXAMPLE 2

DRIVE CURRENT WAVEFORM OF EXAMPLE 3

IMAGE DATA
(AFTER SPECIFIED PIXELS ARE EXTRACTED)

DRIVE CURRENT WAVEFORM OF EXAMPLE 4

DRIVE CURRENT WAVEFORM OF EXAMPLE 5

DRIVE CURRENT WAVEFORM OF EXAMPLE 6

US 9,521,295 B2

IMAGE FORMING APPARATUS AND IMAGE FORMING METHOD

CROSS-REFERENCE TO RELATED APPLICATIONS

The present application claims priority to and incorporates by reference the entire contents of Japanese Patent Application No. 2013-249789, filed in Japan on Dec. 3, 2013, and Japanese Patent Application No. 2014-029335, filed in Japan on Feb. 19, 2014.

BACKGROUND OF THE INVENTION

1. Field of the Invention

The present invention relates to an image forming apparatus and an image forming method. More specifically, the present invention relates to an image forming apparatus and an image forming method that scan an image bearer with light from a light source.

2. Description of the Related Art

A conventional image forming apparatus is known that scans an image bearer with light that is modulated according to image information (e.g., Japanese Laid-open Patent Publication No. 2005-193540).

The image forming apparatus disclosed in Japanese Laid-open Patent Publication No. 2005-193540, has a risk that density unevenness occurs in a formed image.

SUMMARY OF THE INVENTION

It is an object of the present invention to at least partially solve the problems in the conventional technology.

An image forming apparatus includes: a light source; and a light source control unit that supplies a pulse drive current according to image data to the light source. An amplitude of a part of the drive current corresponding to a specified pixel of the image data is larger than an amplitude of a part of the drive current corresponding to a normal pixel of the image data that is a pixel other than the specified pixel and the pulse width of the part of the drive current corresponding to the specified pixel is smaller than the pulse width of the part of the drive current corresponding to the normal pixel.

An image forming method forms an image by scanning an image bearer with light from a light source. The image forming method includes supplying a pulse drive current according to image data to the light source. The amplitude of a part of the drive current corresponding to a specified pixel of the image data is larger than the amplitude of a part of the drive current corresponding to a normal pixel of the image data that is a pixel other than the specified pixel and the pulse width of the part of the drive current corresponding to the specified pixel is smaller than the pulse width of the part of the drive current corresponding to the normal pixel.

An image forming apparatus includes: a light source; and a control device that controls the light source according to the image information. The control device causes a time during which the light source emits light to form a specified pixel of the image, to be shorter than a time during which the light source emits light to form a normal pixel of the image that is a pixel other than the specified pixel and causes an the intensity of the light source to form the specified pixel, to be larger than an intensity of the light source to form the normal pixel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6A and 6B describe a normal current and a power modulation current, respectively;

DETAILED DESCRIPTION OF THE PREFERRED EMBODIMENTS

Figure 1:
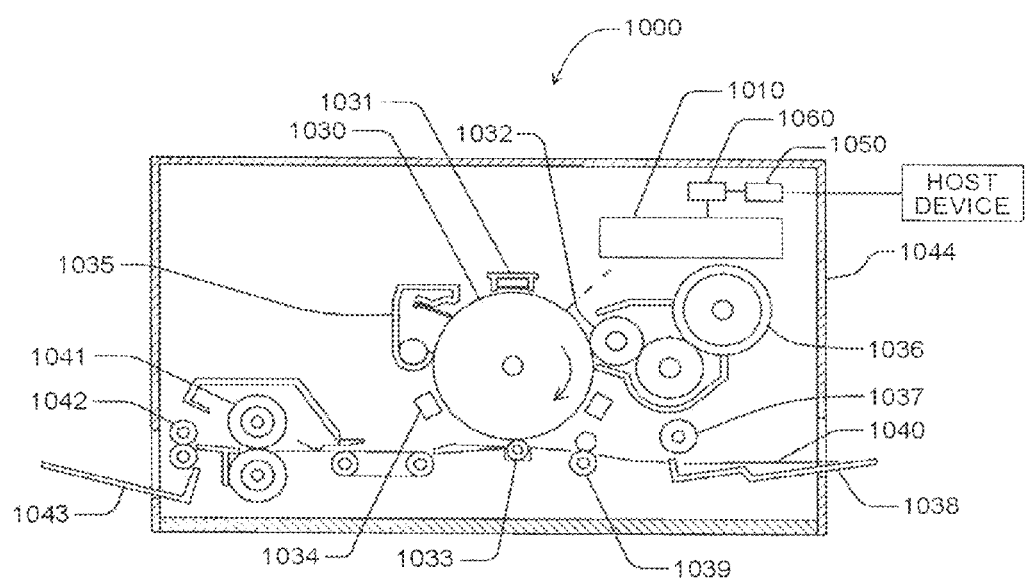
FIG. 1 shows a schematic configuration of a laser printer according to an embodiment.

An embodiment of the invention will be described below according to FIGS. 1 to 15. FIG. 1 shows a schematic configuration of a laser printer 1000 according to the embodiment.

The laser printer 1000 includes an optical scanning device 1010, a photosensitive drum 1030, a charger 1031, a developing roller 1032, a transfer charger 1033, a neutralization unit 1034, a cleaning unit 1035, a toner cartridge 1036, a paper feeding roller 1037, a paper feeding tray 1038, a registration roller pair 1039, a fixing roller 1041, a paper ejection roller 1042, a paper ejection tray 1043, a communication control device 1050, and a printer control device 1060 that generally controls the above-listed units. These are housed in given positions in a printer casing 1044.

The communication control device 1050 controls interactive communications with a host device (e.g., a personal computer) via a network or the like.

The photosensitive drum 1030 is a cylindrical member with a surface on which a photosensitive layer is formed. In other words, the surface of the photosensitive drum 1030 is a surface to be scanned. The photosensitive drum 1030 rotates in the direction denoted by the arrow shown in FIG. 1.

The charger 1031, the developing roller 1032, the transfer charger 1033, the neutralization unit 1034, and the cleaning unit 1035 are disposed near the surface of the photosensitive drum 1030. The charger 1031, the developing roller 1032, the transfer charger 1033, the neutralization unit 1034, and the cleaning unit 1035 are disposed in this order along the direction in which the photosensitive drum 1030 rotates.

The charger 1031 charges the surface of the photosensitive drum 1030 uniformly.

The optical scanning device 1010 scans the surface of the photosensitive drum 1030, which is charged by the charger 1031, in the main-scanning direction with laser light that is modulated according to the image data from the host device, such as a PC, to form an electrostatic latent image corresponding to the image information on the surface of the photosensitive drum 1030. The formed electrostatic latent image moves toward the developing roller 1032 as the photosensitive drum 1030 rotates. The configuration of the optical scanning device 1010 will be described later.

The toner cartridge 1036 stores toner to be supplied to the developing roller 1032.

The developing roller 1032 attaches the toner supplied from the toner cartridge 1036 onto the electrostatic latent image, which is formed on the surface of the photosensitive drum 1030, so that the image information is visualized. The electrostatic latent image to which the toner is attached (hereinafter, also referred to as "toner image") moves toward the transfer charger 1033 as the photosensitive drum 1030 rotates.

Recording paper sheets 1040 are stored on the paper feeding tray 1038. The paper feeding roller 1037 is disposed near the paper feeding tray 1038 and the paper feeding roller 1037 takes out the recording paper sheets 1040 one by one from the paper feeding tray 1038 and conveys the recording paper sheet 1040 to the registration roller pair 1039. The registration roller pair 1039 temporarily holds the recording paper sheet 1040 taken out by the paper feeding roller 1037 and sends the recording paper sheet 1040 toward the gap between the photosensitive drum 1030 and the transfer charger 1033 in synchronization with the rotation of the photosensitive drum 1030.

A voltage with a polarity opposite to that of the toner is being applied to the transfer charger 1033 in order to electrically attract the toner on the surface of the photosensitive drum 1030 to the recording paper sheet 1040. The voltage causes the toner image on the surface of the photosensitive drum 1030 to be transferred onto the recording paper sheet 1040. The recording paper sheet 1040 with the transferred toner image is sent to the fixing roller 1041.

The fixing roller 1041 applies heat and pressure to the recording paper sheet 1040 and accordingly the toner is fixed onto the recording paper sheet 1040. The recording paper sheet 1040 with the fixed toner is then sent via the paper ejection roller 1042 to the paper ejection tray 1043 and then stacked sequentially on the paper ejection tray 1043.

The neutralization unit 1034 neutralizes the surface of the photosensitive drum 1030.

The cleaning unit 1035 removes the toner remaining on the surface of the photosensitive drum 1030 (residual toner). The surface of the photosensitive drum 1030 without the residual toner goes back to the position opposed to the charger 1031.

Figure 2:
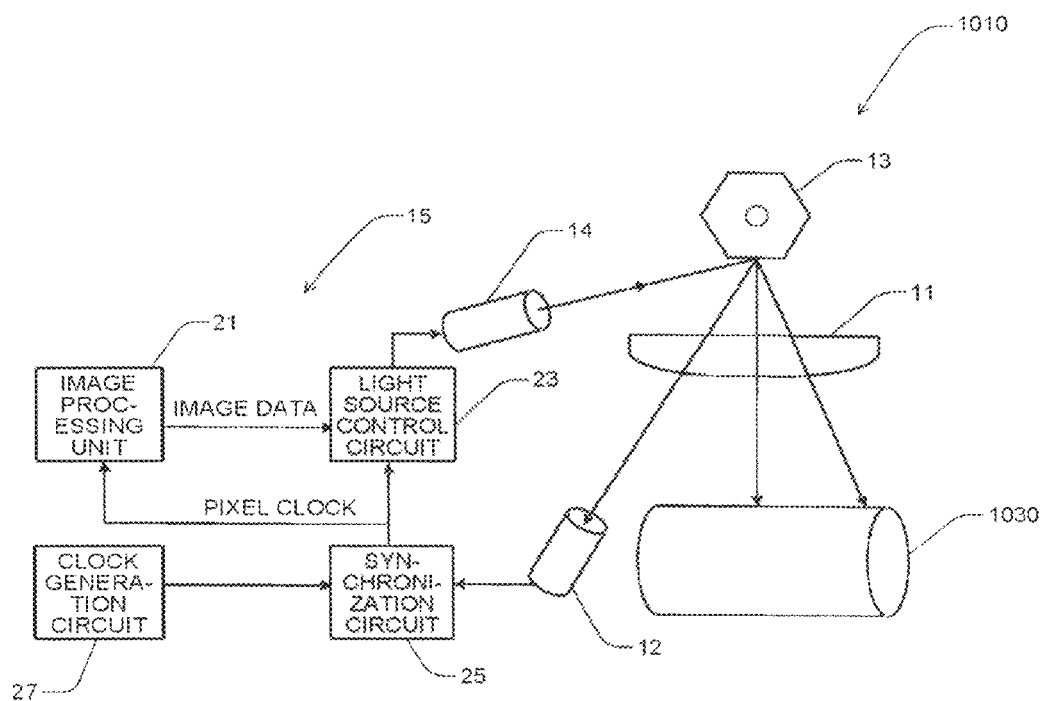
FIG. 2 describes the optical scanning device shown in FIG. 1.

The configuration of the optical scanning device 1010 will be described here. The optical scanning device 1010 includes, as shown in FIG. 2, an LD (laser diode) 14 serving as a light source, a polygon mirror 13, a scanning lens 11, a PD (photodetector) 12 serving as a light receiving element, and a scanning control device 15. These units are fixed at given positions to the housing (not shown).

The direction corresponding to the main-scanning direction will be simply referred to as "main-scanning corresponding direction" and the direction corresponding to the sub-scanning direction will be simply referred to as "sub-scanning corresponding direction" below.

The LD 14 is also referred to as an edge emitting laser, and the LD 14 emits laser light from the edge on one side and the edge on the other side.

In the embodiment, to simplify the descriptions, only one LD is used as the light source; however, practically, an LDA (Laser Diode Array) including multiple LDs arrayed one-dimensionally or two-dimensionally may be used or only one VCSEL (Surface Emitting Laser) or a VCSELA (Surface Emitting Laser Array) including multiple VCSELs arrayed one-dimensionally or two-dimensionally may be used.

The polygon mirror 13 is disposed on the optical path of the laser light that is emitted from the edge of the LD 14 on the one side. For example, the polygon mirror 13 includes a six-sided mirror with an inscribed circle having a radius of 18 mm where each mirror serves as a deflection reflection surface. While being rotating about the axis parallel to the sub-scanning direction corresponding direction, the polygon mirror 13 deflects the laser light emitted from the edge of the LD 14 on the one side.

An optical system (also referred to as a pre-deflector optical system) that focuses the laser light emitted from the edge of the LD 14 on the one side in the sub-scanning direction corresponding direction near the deflection reflection surface of the polygon mirror 13 may be provided between the LD 14 and the polygon mirror 13. Optical components constituting the pre-deflector optical system are, for example, a coupling lens, an aperture member, a cylindrical lens, a reflective mirror and/or the like.

The scanning lens 11 is disposed on the optical path of the laser light that is deflected by the polygon mirror 13. The laser light via the scanning lens 11 is emitted to (is focused on) the surface of the photosensitive drum 1030 so that a light spot is formed. The light spot moves in the longitudinal direction of the photosensitive drum 1030 as the polygon mirror 13 rotates, i.e., the photosensitive drum 1030 is scanned. The direction in which the light spot moves is the "main-scanning direction" and the direction in which the photosensitive drum 1030 rotates is the "sub-scanning direction".

The optical system disposed on the optical path between the polygon mirror 13 and the photosensitive drum 1030 is also referred to as a "scanning optical system". In the embodiment, the scanning optical system is configured of the scanning lens 11. The scanning optical system may include multiple scanning lenses. At least one reflecting mirror may be disposed on the optical path between the scanning lens 11 and the photosensitive drum 1030 on at least one side.

The PD 12 is disposed on the optical path of the laser light, which is deflected by the polygon mirror 13, via the scanning lens 11. The PD 12 sends the result of receiving the laser light to the scanning control device 15. The PD 12 may be disposed downstream or upstream of the photosensitive drum 1030 in the scanning direction.

The laser light from the edge of the LD 14 on the one side is deflected by the polygon mirror 13 that is rotating and is emitted to the photosensitive drum 1030, which is a medium to be scanned, via the scanning lens 11. The emitted laser light becomes a light spot on the photosensitive drum 1030 and accordingly an electrostatic latent image is formed on the photosensitive drum 1030.

The laser light deflected by the polygon mirror 13 is incident on the PD 12 after scanning of one line ends or before scanning of one line starts. Upon receiving the laser light, the PD 12 converts the intensity of the received light into an electric signal and outputs the electric signal to a synchronization circuit 25.

The scanning control device 15 includes, for example, an image processing unit 21, an LD control circuit 23 (light source control unit) 23, a synchronization circuit 25, and a clock generation circuit 27.

Once the electric signal is input to the synchronization circuit 25, the synchronization circuit 25 generates a pixel clock for the next one scanning line. The high frequency clock signal is input from the clock generation circuit 27 to the synchronization circuit 25 to implement phase synchronization of the pixel clock. The pixel clock generated by the synchronization circuit 25 is supplied to the image processing unit 21 and the LD control circuit 23.

The image processing unit 21 performs given processing on the image data from the host device and supplies the processed image data to the LD control circuit 23 according to the pixel clock from the synchronization circuit 25.

The LD control circuit 23 drives the LD 14 according to the pixel clock from the synchronization circuit 25 and the image data from the image processing unit 21. Accordingly, an electrostatic latent image corresponding to the image data is formed on the photosensitive drum 1030.

Figure 3:
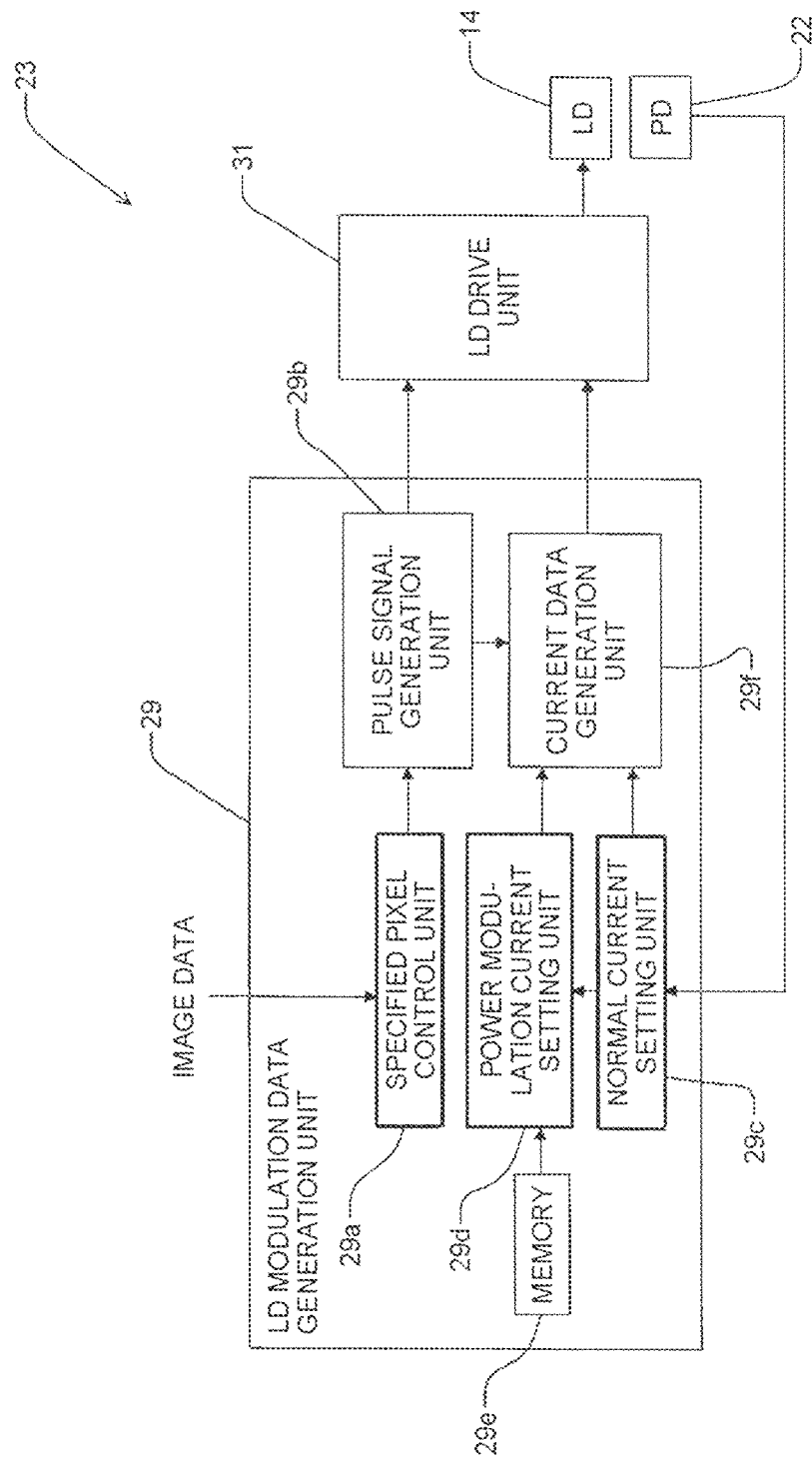
FIG. 3 (first diagram) describes a configuration of an LD control circuit.
Figure 4:
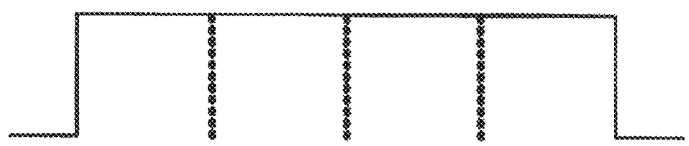
FIG. 4 describes a method of generating an LD control signal.
Figure 4:
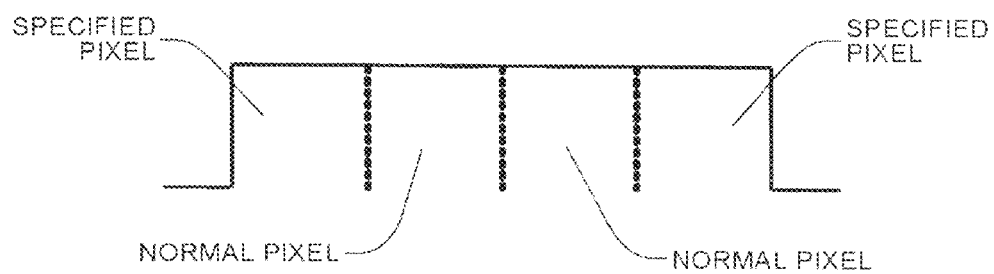
Figure 4:
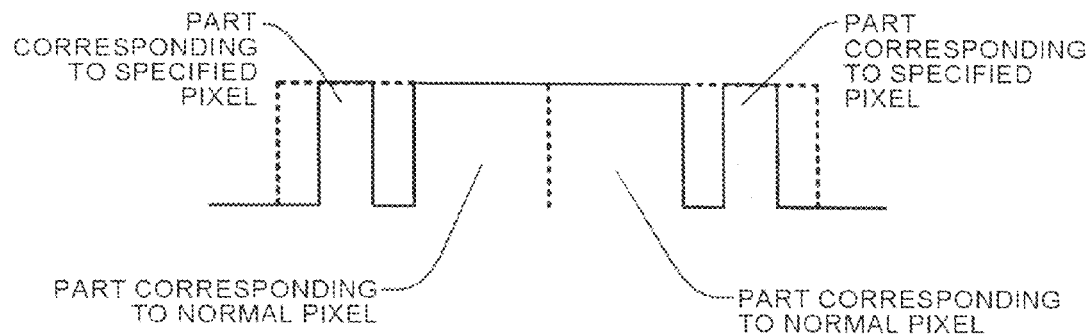

The LD control circuit 23 will be described in detail below. For example, as shown in FIG. 3, the LD control circuit. 23 includes, as shown in FIG. 3, an LD modulation data generation unit 29 and an LD drive unit 31. The LD control circuit 23 supplies a pulse drive current to the LD 14.

The LD modulation data generation unit 29 includes, for example, a specified pixel control unit $29a_,$, a pulse signal generation unit $29b_,$, a normal current setting unit $29c_,$, a power modulation current setting unit $29d_,$, a memory $29e_,$, and a current data generation unit $29f$.

The specified pixel control unit $29a$, detects a specified pixel from among the multiple pixels constituting the image data from the host device, generates a control signal for controlling the timing at which the LD 14 is turned on and the time during which the LD 14 is kept on to form a specified pixel, and transmits the control signal and the image data to the pulse signal generation unit $29b$. The control signal sets the time during which the LD 14 is kept on to form the specified pixel to a time shorter than that to form a normal pixel. The normal pixel refers to a pixel other than specified pixel from among the multiple pixels constituting the image data.

The specified pixel control unit $29a$, detects specified pixels by performing pattern matching on the image data from the host device. The "specified pixels" are, for example, pixels contained in the edge part (see FIG. 4(B)) of a pixel group consisting of multiple pixels of the image data that are arrayed in the main-scanning direction (at least a part of one scanning line, see FIG. 4(A)).

If there is object information representing the attribute of the image data, pattern matching is performed on a necessary image area according to the attribute of the image data to detect specified pixels. The "attribute of the image data" includes, for example, a letter, a photo, and a diagram.

According to the control signal and the image data from the specified pixel control unit $29a_,$, the pulse signal generation unit $29b$, generates a pulse signal (also referred to as an LD control signal below) for controlling the timing at which the LD 14 is turned on/off and outputs the pulse signal to the current data generation unit $29f$, and the LD drive unit 31. The LD control signal is generated such that the pulse width of the part corresponding to a specified pixel is smaller than the pulse width of a part corresponding to a normal pixel (see FIG. 4(C)). In other words, the LD control signal is generated such that the part of the pulse drive current, which is supplied to the LD 14, corresponding to the specified pixel is smaller than the pulse width of a part corresponding to a normal pixel.

Specifically, regarding the LD control signal and the drive current, the ratio of the pulse width of the part corresponding to the specified pixel with respect to the pulse width of the part corresponding to the normal pixel is approximately 1/N (N>1), where N is a magnification described later.

Regarding the LD control signal, as described above, the pulse width of the part corresponding to the specified pixel is smaller than the pulse width of a part corresponding to a normal pixel and the phase of the part corresponding to the specified pixel is adjusted. A case where the center position of the part of the LD control signal corresponding to the specified pixel in the main-scanning direction coincide with the original center position or does not greatly deviate from the center position is hereinafter referred to as the center phase, a case where the center position is located more rightward than the center phase on the diagram is referred to as the right phase, and a case where the center position is located more leftward than the center phase on the diagram is referred to as the left phase.

Figure 5A:
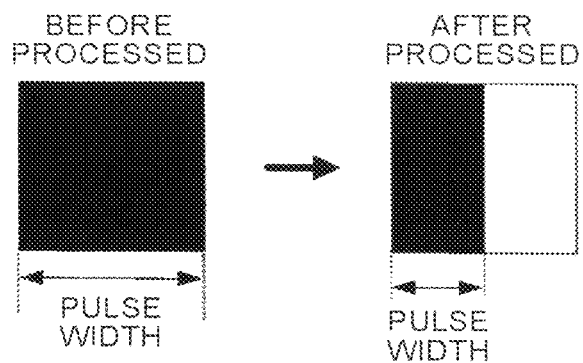
FIGS. 5A to 5C describe processing for adjusting the phase of a part of the LD control signal corresponding to a specified pixel.
Figure 5B:
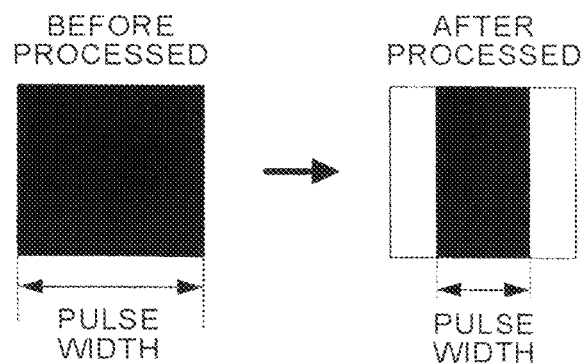
Figure 5C:
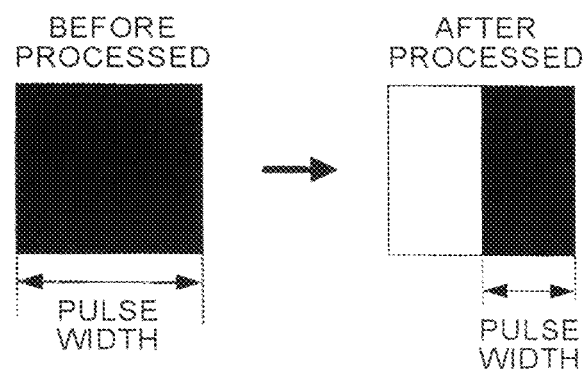
Figure 7:
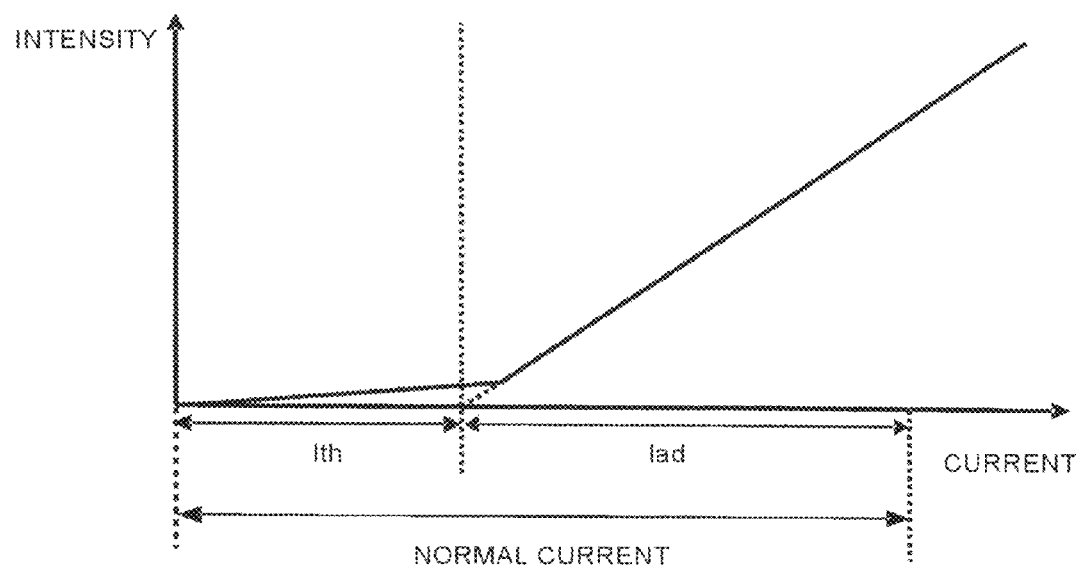
FIG. 7 shows luminescence properties of the LD.

For example, FIG. 5A represents the states before and after the processing for changing the pulse width of the part of the LD control signal corresponding to the specified pixel to 50% and setting the phase to the left phase. FIG. 5B represents the states before and after the processing for changing the pulse width of the part of the LD control signal corresponding to the specified pixel to 50% and setting the phase to the center phase. FIG. 5C represents the states before and after the processing for changing the pulse width of the part of the LD control signal corresponding to the specified pixel to 50% and setting the phase to the right phase.

The normal current setting unit 29c, sets a normal current that is a current value necessary for the LD 14 to emit light to form a normal pixel.

The "normal current" is a current value for fixing a normal intensity that is an intensity for a normal pixel. The "normal intensity" means an intensity with which an appropriate amount of attached toner to form a solid image using optical scanning on the photosensitive drum 1030 is obtained.

The "normal current" is, as shown in FIG. 6A, a sum of a threshold current Ith (see FIG. 7) and an additional current Iad (see FIG. 7) of the LD 14. The threshold current Ith is a current value at which the LD 14 starts laser oscillations and hardly contributes the intensity of the LD 14 (emission intensity). Accordingly, practically, the intensity of the LD 14 only depends on the additional current Iad.

A PD 22 (photodetector) serving as the optical detector for monitoring the intensity is provided on the optical path of the laser light emitted from the edge of the LD 14 on the other side (see FIG. 3). The PD 22 receives the laser light from the LD 14, converts the intensity of the received light into an electric signal, and outputs the electric signal to the normal current setting unit 29c. The PD 22 may be not provided and the PD 12 may serve as the optical detector for monitoring the intensity.

The normal current setting unit 29c, adjusts the additional current Tad according to the result of detection by the PD 22 (intensity of the received light). In other words, APC (auto power control) is performed. In this case, in accordance with the adjustment of the additional current Iad, the normal current is adjusted.

The normal current setting unit 29c, configured as described above uses, as the normal current, the value that is obtained by summing the threshold current Ith and the adjusted addition current Iad (Ith+Iad), transmits the normal current to the current data generation unit 29f, and transmits the adjusted additional current Tad to the power modulation current setting unit 29d.

The power modulation current setting unit 29d, sets a power modulation current that is a current value necessary to cause the LD 14 to emit light to form the specified pixel.

The "power modulation current" is, as shown in FIG. 6B, a sum of the threshold current Ith and a value obtained by multiplying the additional current Iad by N (N>1). In this case, in accordance with the adjustment of the additional current Iad, the power modulation current is adjusted.

"N" is a given value that is referred to as a magnification (or power modulation value). "N" is stored in the memory 29e. Specifically, N may be an integer equal to or larger than 2. The magnification N is preferably determined according to the properties of the photosensitive drum, toner, development and/or the like.

The product of the magnification N and the ratio of the pulse width of the part of the pulse drive current corresponding to the specified pixel with respect to the pulse width of the part of the pulse drive current corresponding to the normal pixel (approximately 1/N) is approximately 1. In this case, the electric charge to be supplied to the LD 14 can be approximately the same between a case of forming the specified pixel and a case of forming the normal pixel.

The power modulation current setting unit 29d, configured as described above reads the magnification N from the memory 29e, sets the power modulation current to the value obtained by summing the threshold current Ith and the value obtained by multiplying the adjusted additional current Tad from the normal current setting unit 29c, by N (Ith+Iad×N), and transmits the power modulation current to the current data generation unit 29f.

The current data generation unit 29f, generates current data (analog data) according to the LD control signal from the pulse signal generation unit 29b,, the normal current from the normal current setting unit 29c,, and the power modulation current from the power modulation current setting unit 29d,, digitalizes (binarizes) the current data, and outputs the digital current data to the LD drive unit 31. The current data is generated such that the amplitude of the part of the pulse drive current supplied to the LD 14 corresponding to the specified pixel corresponds to the power modulation current and such that the amplitude of the part corresponding to the normal pixel corresponds to the normal current (<the power modulation current).

Figure 8:
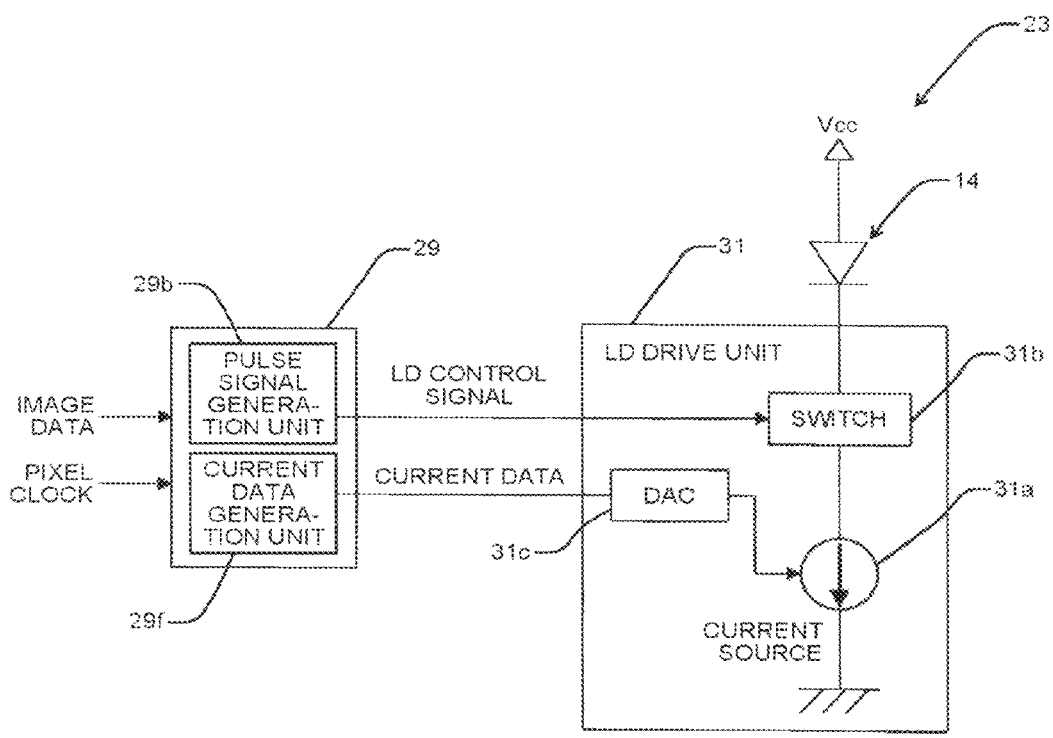
FIG. 8 descries the configuration of the LD.

As shown in FIG. 8, the LD drive unit 31 drives the LD 14 according to the LD control signal and the current data from the LD modulation data generation unit 29.

Specifically, the LD drive unit 31 is configured to cause a current source 31a, to let a current flow in the forward direction of the LD 14 via a switch 31b, (e.g., a transistor).

The switch 31b, is connected to the pulse signal generation unit 29b, and is turned on/off according to the LD control signal. When the LD control signal is at H (a high level), the switch 31b, is turned on to turn on the LD 14 and, when the LD control signal is at L (a low level), the switch 31b, is turned off to turn off the LD 14.

The current source 31a, is connected to the current data generation unit 29f, via a DAC 31c, (Digital to Analog Converter). In this case, the current data (digital data) from the current data generation unit 29f, is converted by the DAC 31c, into analog data and the analog data is then output to the current source 31a.

Figure 9:
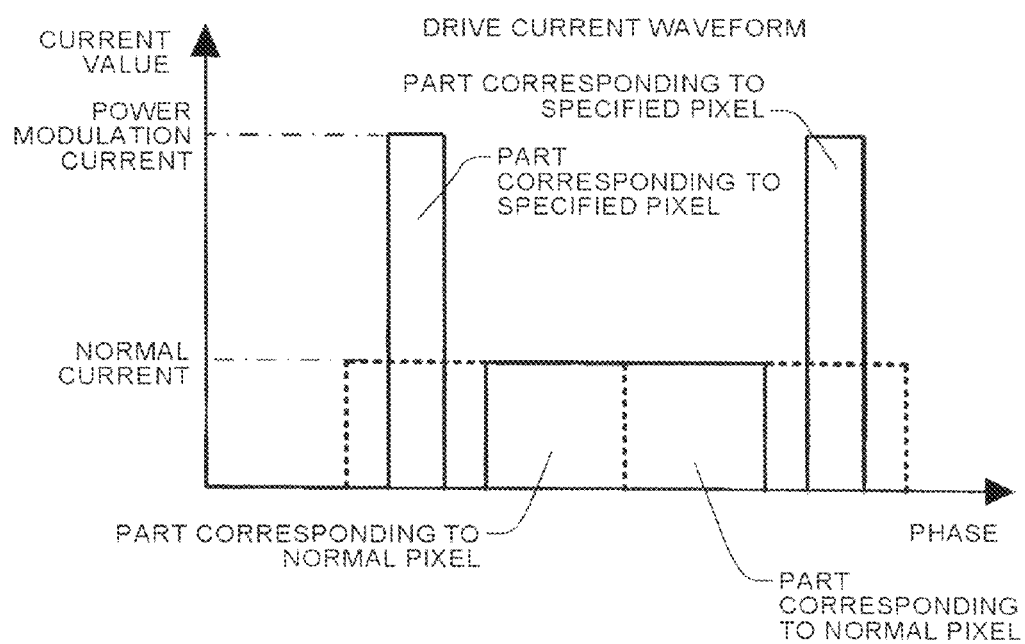
FIG. 9 shows the waveform of a pulse drive current that is supplied to the LD.

Thus, once the LD control signal and the current data are output from the LD modulation data generation unit 29 to the switch 31b, and the DAC 31c,, respectively, in synchronization with each other, a pulse drive current (see FIG. 9) where the amplitude of the part corresponding to the specified pixel is larger than the amplitude of the part corresponding to the normal pixel and the pulse width of the part corresponding to the specified pixel is smaller than the pulse width of the part corresponding to the normal pixel is supplied to the LD 14. FIG. 9 represents an exemplary case where the phase of the part of the drive current corresponding to the specified pixel is the center phase.

The pulse drive current is supplied to the LD 14, which accordingly adjusts the intensity and the width in the main-scanning direction for the specified pixel contained in the edge part of the image (also referred to as the output image below) that is formed according to the image data. In order to simplify the descriptions, the pixel of the output image corresponding to the specified pixel of the image data is also referred to as the specified pixel and the pixel of the output image corresponding to the normal pixel of the image data is also referred to as the normal pixel.

Figure 10A:
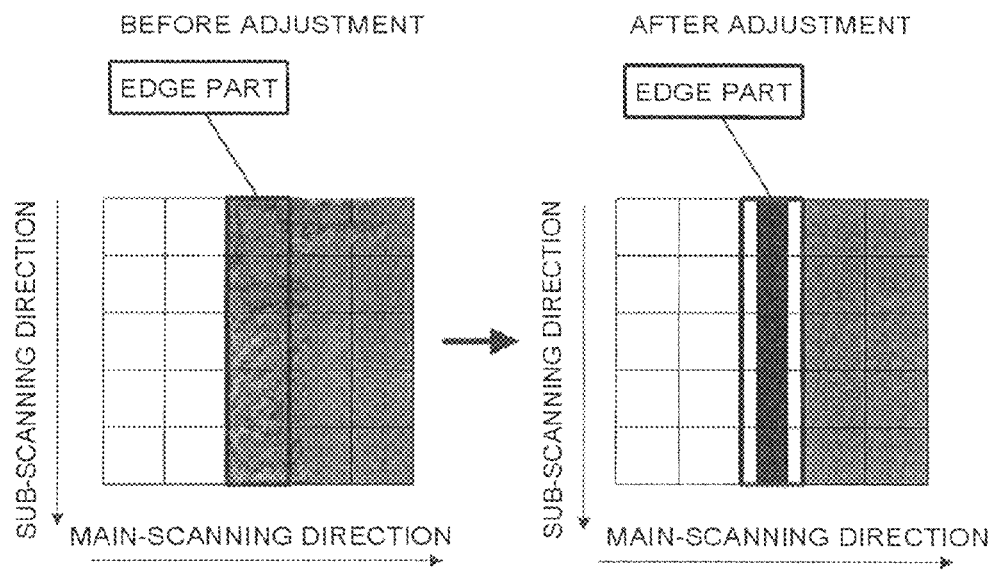
FIGS. 10A and 10B describe respective specific examples of processing for adjusting the time during which the LD emits light and the intensity of the LD for the edge part of image data.
Figure 10B:
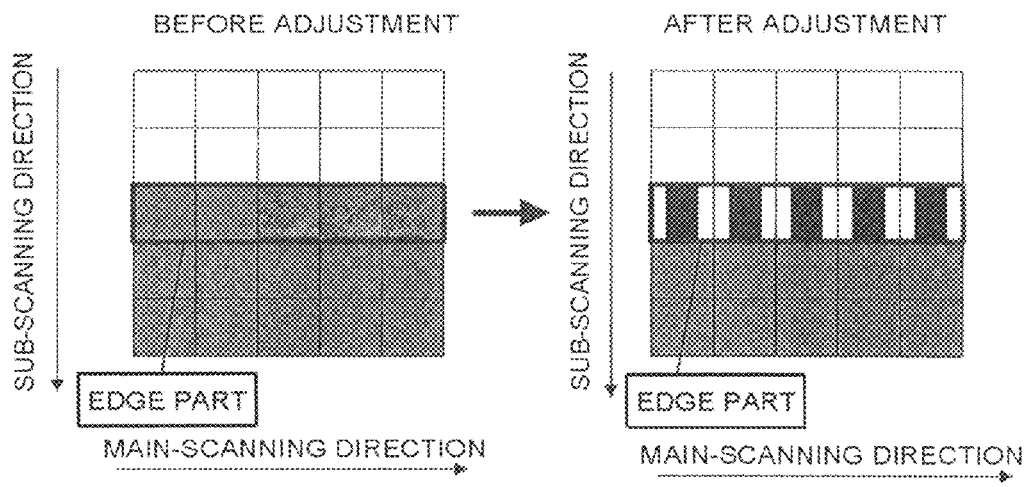

FIGS. 10A and 10B represent the states before and after the intensity and the width in the main-scanning direction for multiple specified pixels contained in the edge part of the output image in the main-scanning/sub-scanning direction are adjusted. FIG. 10A shows an enlarged area that contains the edge part of the output image in the main-scanning direction and FIG. 10B shows an enlarged area containing the edge part of the output image in the sub-scanning direction.

The width for the specified pixel of the output image in the main-scanning direction is smaller than that for the normal pixel and the intensity for the specified pixel is larger than that for the normal pixel. Specifically, the width for the specified pixel in the main-scanning direction is a half of the width for the normal pixel and the intensity for the specified pixel is 200% of that for the normal pixel. The phase for the specified pixel is the center phase.

Figure 11A:
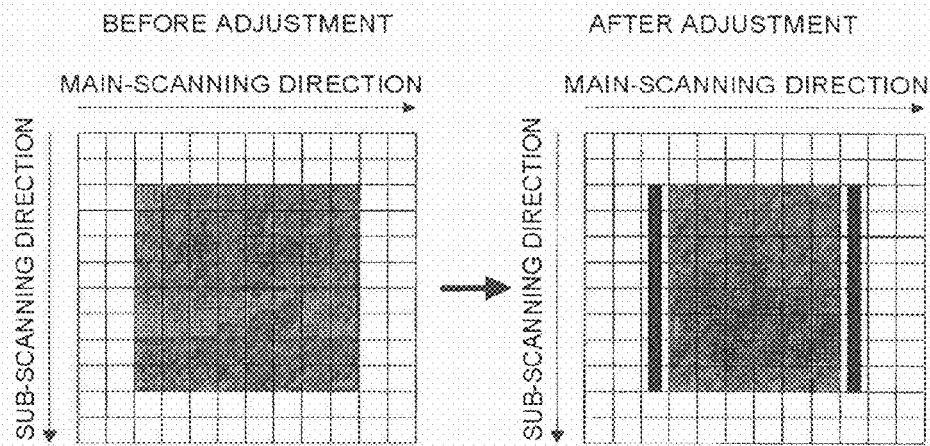
FIGS. 11A and 11B describe respective specific examples of processing for adjusting the time during which the LD emits light and the intensity of the LD for the edge part of the image data (solid image)
Figure 11B:
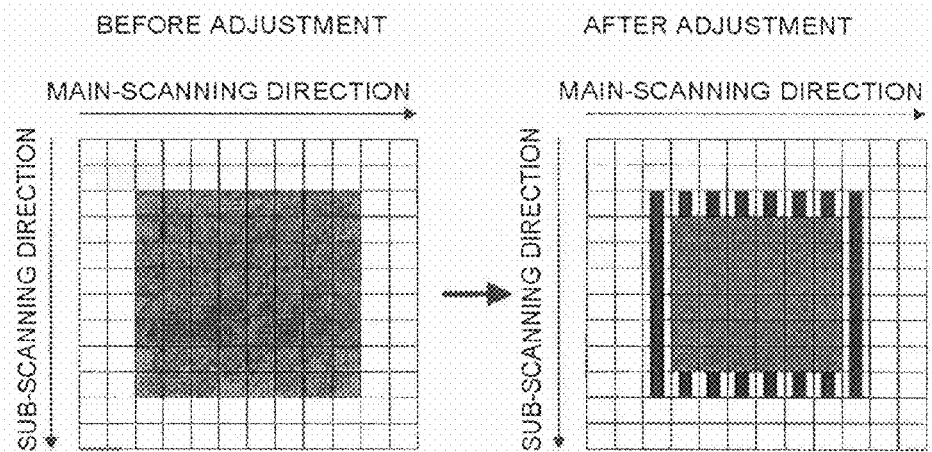

FIG. 11A represents the states before and after the intensity and the width in the main-scanning direction for the multiple specified pixels contained in the edge part of the output image (e.g., solid image) in the main-scanning direction are adjusted. FIG. 11B represents the states before and after the intensity and the width in the main-scanning direction for the multiple specified pixels contained in the edge parts of the output image (e.g., solid image) in the sub-scanning direction and the sub-scanning direction are adjusted.

Figure 12A:
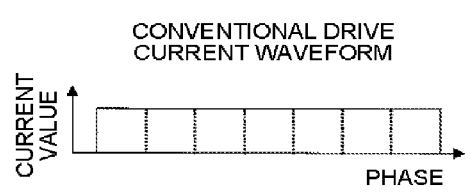
FIG. 12(A) shows a conventional drive current waveform and FIGS. 12(B) to 12(D) show drive current waveforms according to Examples 1, to 3, respectively.

FIG. 12(A) shows a conventional drive current waveform. Regarding the conventional drive current, the amplitude and the pulse width of the part corresponding to each pixel of image data is constant.

Figure 12B:
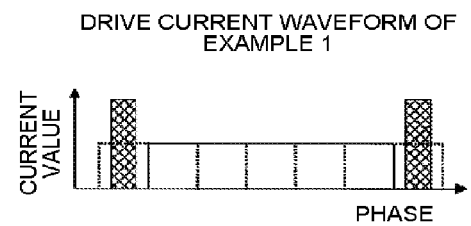
Figure 12C:
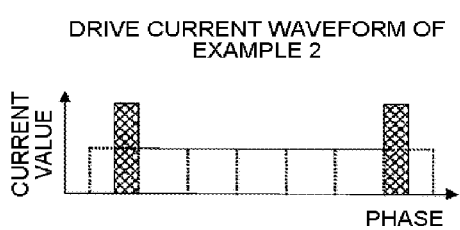
Figure 12D:
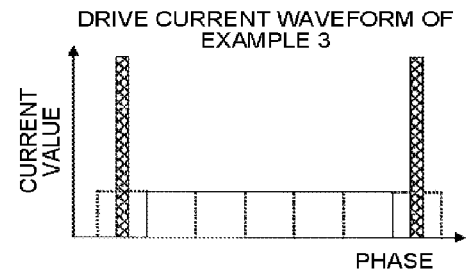

FIGS. 12(B) to 12(D) show drive current waveforms of Examples 1, to 3, respectively.

In the drive current waveform of Example 1, shown in FIG. 12(B), the hatched part represents a part corresponding to one specified pixel and the void rectangular part represents a part of the drive current corresponding to one normal pixel. In Example 1, the part of the drive current corresponding to one specified pixel has a pulse width (Duty) of 50% of that of the part of the drive current corresponding to one normal pixel and has an amplitude (current value) of 200% of that of the part corresponding to one normal pixel. In other words, the product of the amplitude and the pulse width of the part corresponding to one specified pixel (the area of the hatched part) is equal to the product of the amplitude and the pulse width of the part corresponding to one normal pixel (the area of the square part). The phase is a center phase. Accordingly, in Example 1, the edge parts of the image in the main-scanning direction can be made sharp, which increases the image reproducibility. On the other hand, in the conventional drive current waveform shown in FIG. 12(A), the edge parts of the image in the main-scanning direction cannot be made sharp, which lowers the image reproducibility.

The drive current waveform of Example 2, shown in FIG. 12(C) is one obtained by shifting the phase of the drive current waveform of Example 1, toward the center in the main-scanning direction. In this case, the same effects as those obtained in Example 1, can be obtained and, because there is no time during which electrification is off in the middle of the image, the area with a low electric field where toner attachment is unstable can be reduced.

In the drive current waveform of Example 3, shown in FIG. 12(D), the part corresponding to one specified pixel has the same phase (center phase) as the phase of the drive current waveform of Example 1, has a pulse width (Duty) of 25% of that of the part of the drive current corresponding to one normal pixel, and has an amplitude (current value) of 400% of that of the part corresponding to one normal pixel. In other words, the product of the amplitude and the pulse width of the part corresponding to one specified pixel (the area of the hatched part) is equal to the product of the amplitude and the pulse width of the part corresponding to one normal pixel (the area of the square part). In this case, because the same effects as those obtained in Example 1, can be obtained and the edge part is further enhanced, toner scattering can be prevented and an increase in sharpness and the density stability can be implemented.

Figure 13A:
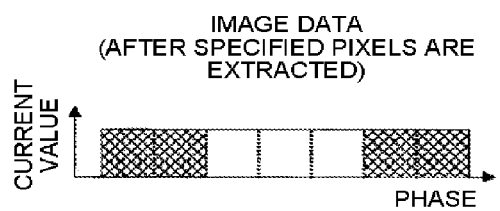
FIG. 13(A) shows image data (after detection of specified pixels) and FIGS. 13(B) to 13(D) show drive current waveforms according to Examples 4, to 6, respectively.

FIG. 13(A) represents image data (after detection of specified pixels). Here, two pixels contained in each of both edge parts on both sides in the main-scanning direction are detected as specified pixels (the hatched part shown in FIG. 13(A)).

FIGS. 13(8) to 13(D) show drive current waveforms of Examples 4, to 6, respectively. Each of the drive current waveforms of Examples 4, to 6, is generated according to the image data shown in FIG. 13(A).

Figure 13B:
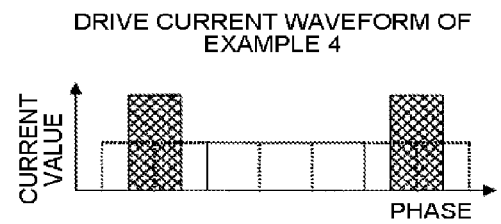

In the drive current waveform of Example 4, shown in FIG. 13(B), the hatched part represents a part corresponding to two specified pixels and the void rectangular part represents a part corresponding to one normal pixel. In the drive current waveform of Example 4, the part corresponding to two specified pixels has a pulse width (Duty) of 50% of that of a part corresponding to two normal pixels and has an amplitude (current value) of 200% of that of the part corresponding to two normal pixels. In other words, the product of the amplitude and the pulse width of the part corresponding to two specified pixels (the area of the hatched part) is equal to the product of the amplitude and the pulse width of the part corresponding to two normal pixels (the area of two square parts). The parts corresponding to two specified pixels are adjacent to each other and integrated in the main-scanning direction. In this case, the same effects as those obtained in Example 1, can be obtained.

Figure 13C:
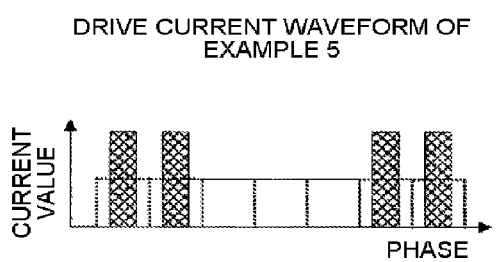

In the drive current waveform of Example 5, shown in FIG. 13(C), the parts corresponding to two specified pixels are separated from each other in the main-scanning direction. In this case, the same effects as those obtained in Example 1, can be obtained.

Figure 13D:
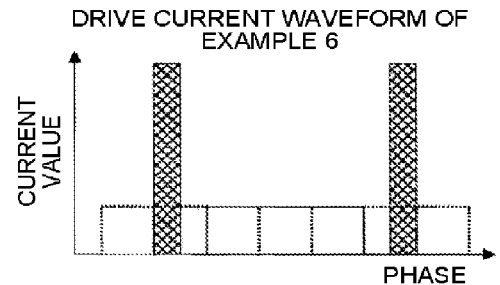

In the drive current waveform of Example 6, shown in FIG. 13(D), the part corresponding to two specified pixels have a pulse width (Duty) of 25% of that of the part corresponding to two normal pixels and has an amplitude (current value) of 400% of that of the part corresponding to two normal pixels. In other words, the product of the amplitude and the pulse width of the part corresponding to two specified pixels (the area of the hatched part) is equal to the product of the amplitude and the pulse width of the part corresponding to two normal pixels (the area of two square parts). In this case, because the same effects as those obtained in Example 1, can be obtained and the edge part is further enhanced, toner scattering can be prevented and an increase in sharpness and the density stability can be implemented.

The laser printer 1000 of the above-described embodiment is an image forming apparatus that forms an image by scanning the photosensitive drum 1030 with the light from the LD 14. The laser printer 1000 includes the LD control circuit (light source control unit) that supplies a pulse drive current according to image data to the LD 14. In the drive current, the amplitude of a part corresponding to a specified pixel of the image data is larger than the amplitude of a part corresponding to a normal pixel of the image data that is a pixel other than the specified pixel and the pulse width of the part corresponding to the specified pixel is smaller than the pulse width of the part corresponding to the normal pixel.

In other words, an image forming method using the laser printer 1000 of the embodiment is an image forming method of forming an image by scanning the photosensitive drum 1030 with the light from the LD 14. The image forming method includes supplying a pulse drive current according to image data to the LD 14, in which the amplitude of a part of the drive current corresponding to a specified pixel of the image data is larger than the amplitude of a part of the drive current corresponding to a normal pixel of the image data other than the specified pixel and the pulse width of the part corresponding to the specified pixel is smaller than the pulse width of the part corresponding to the normal pixel.

Accordingly, the laser printer 1000 and the image forming method according to the embodiment can prevent occurrence of density evenness in a formed image (output image).

Figure 14A:
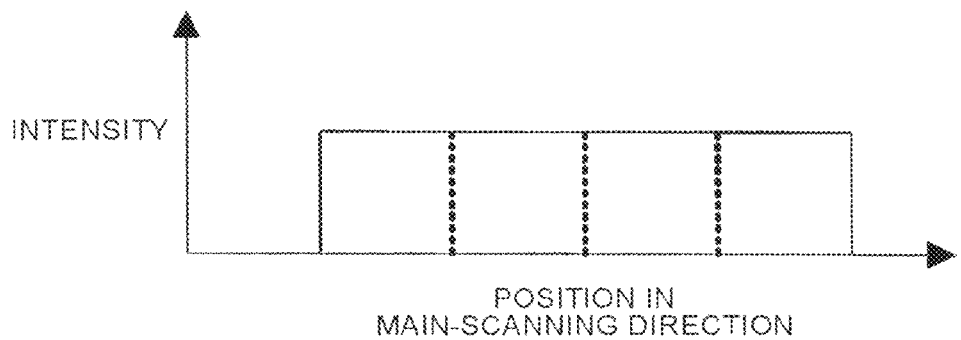
FIG. 14A is a graph representing the intensity at each position on a photosensitive drum in the main-scanning direction according to a comparative example and FIG. 14B is a graph representing changes in the developing electric field on the photosensitive drum in the main-scanning direction according to the comparative example.
Figure 14B:
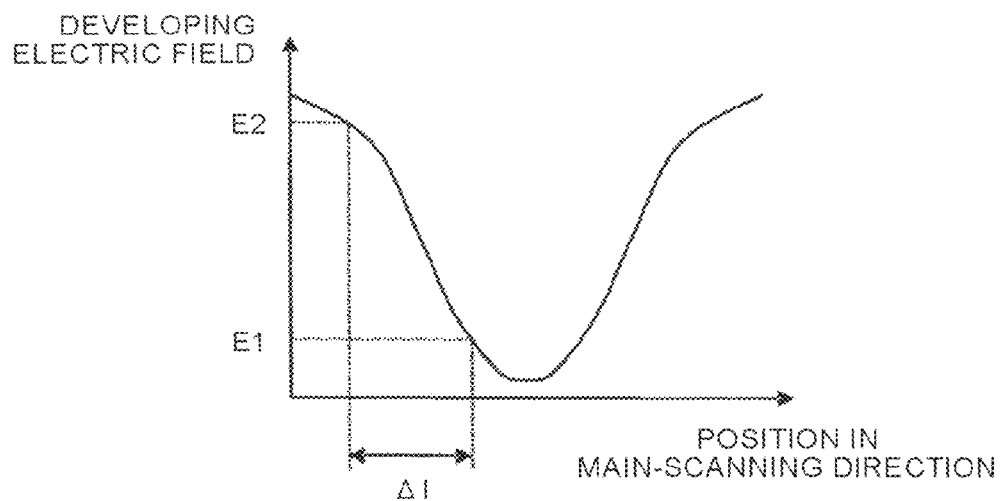

The operations of the laser printer 1000 according to the embodiment will be described using a specific example. FIGS. 14A and 14B represent an optical waveform of light with which the photosensitive drum is scanned and change of the developing electric field in the main-scanning direction when the optical scan has been performed. As it is understood from FIG. 14A, because the photosensitive drum is scanned in the main-scanning direction with an optical waveform of a constant intensity, a large area (area between E1, and E2) with a poor electric field (Δ1) where toner attachment is unstable is produced as shown in FIG. 14B. As a result, the area where toner attachment is unstable increases and accordingly density unevenness is produced on the image on the recording medium. Furthermore, the sharpness of the edge part of the line image lowers due to unevenness of toner attachment.

Figure 15A:
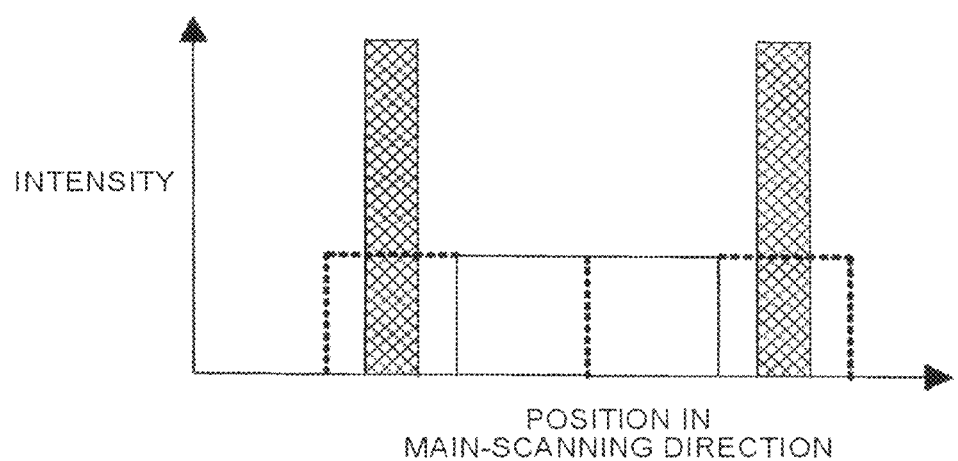
FIG. 15A is a graph representing the intensity at each position on a photosensitive drum in the main-scanning direction according to the embodiment and FIG. 15B is a graph representing changes in the developing electric field on the photosensitive drum in the main-scanning direction according to the embodiment.
Figure 15B:
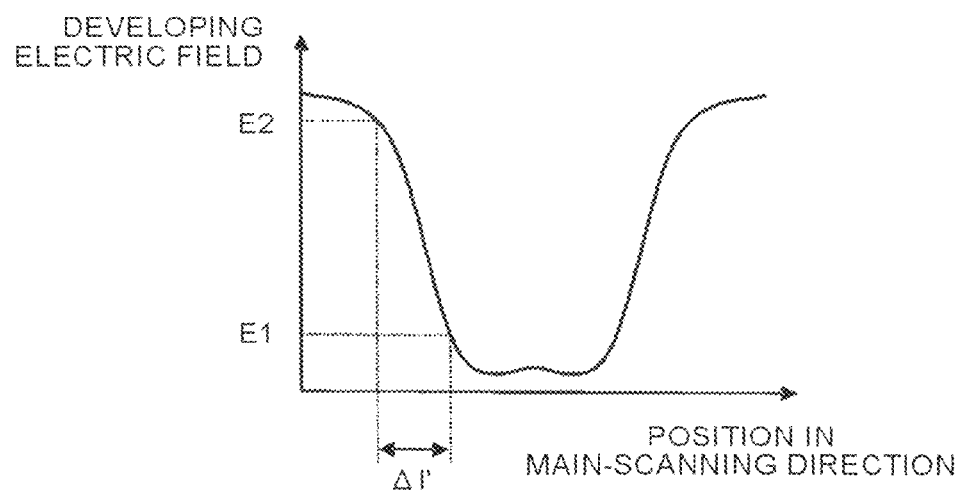

On the other hand, FIGS. 15A and 15B represent an optical waveform of light with which the photosensitive drum is scanned and change of the developing electric field in the main-scanning direction when the optical scan has been performed. According to FIGS. 15A, the intensity of the LD 14 to form the pixel of the edge part is larger than that to form a normal pixel, which results in a steep change of the electric field. For this reason, as shown in FIG. 15B, the distance of the area with a low electric field (area between E1, and E2) where toner attachment is unstable can be made Δ1' (<Δ1) and the area where toner attachment is unstable can be narrowed. As a result, unevenness of toner attachment can be reduced, which increases the stability of toner density and increases the sharpness of the edge part of the line image. Furthermore, because the pulse width is reduced, the total exposure energy does not significantly increase and accordingly appropriate exposure energy can be maintained.

As a result, the laser printer 1000 and the image forming method according to the embodiment can control occurrence of density unevenness of the image resulting from change of the developing electric field on the photosensitive drum 1030 in the main-scanning direction and can increase the image reproducibility.

Because the LD control circuit 23 can adjust the phase of the part of the drive current corresponding to the specified pixel, the sharpness of the specified pixel can be increased and the density can be stabilized.

The product of the magnification N and the ratio of the pulse width of the part of the drive current corresponding to the specified pixel to the pulse width of the part of the drive current corresponding to the normal pixel (approximately 1/N) is approximately 1. In this case, the quantity of charge supplied to the LD 14 can be approximately equal between a case of forming the specified pixel and a case of forming the normal pixel and accordingly the exposure energy for the output image can be kept constant, which controls occurrence of density unevenness.

The above-described ratio is not limited to about 1/N. In short, it is preferable that the ratio is set in accordance with the magnification N. Specifically, the larger the magnification N is, the smaller the ratio is preferably set to be.

The amplitude of the part of the drive current corresponding to the normal pixel is a value (normal current) obtained by summing the threshold current Ith of the LD 14 and the additional current Iad and the amplitude of the part of the drive current corresponding to the specified pixel is a value (power modulation current) obtained by summing the threshold current Ith and the value obtained by multiplying the additional current by N (N>1). The LD control circuit 23 adjusts the additional current Iad according to the result of detection of the light from the LD 14 performed by the PD 22.

In this case, even if the luminescence property (optical output/current property) of the LD 14 changes due to change with time and change in temperature, the intensity of the LD 14 to form the specified pixel and the intensity of the LD 14 to form the normal pixel can be controlled at respective given values (to be constant).

In the above-described embodiment, as an exposure device that exposes a photosensitive drum, the optical scanning device is used. Alternatively, for example, an optical print head including multiple light emitting parts that are at least arrayed separately in a direction parallel to the longitudinal direction of the photosensitive drum may be used. In other words, by rotating the photosensitive drum 1030 with respect to the light from the optical print head, the photosensitive drum may be scanned and exposed. In this case, for example, the pulse width of the part of the pulse drive current, which is supplied to the light emitting parts, corresponding to the specified pixel may be smaller than the pulse width of the part of the pulse drive current corresponding to the normal pixel and the amplitude of the part of the pulse drive current corresponding to the specified pixel may be larger than the amplitude of the part of the pulse drive current corresponding to the normal pixel. In this case, the specified pixel is preferably a pixel contained in the edge part of the image data and is more preferably a pixel contained in the edge part of the image corresponding to the image data in the rotational direction of the photosensitive drum.

In the above-described embodiment, as a light source, the LD (edge emitting laser) is used. Alternatively, for example, a different laser such as a vertical cavity surface emitting laser (VCSEL), a LED (light-emitting diode), or an organic EL device may be used.

In the above-described embodiment, the amplitude and the pulse width of the part of the drive current corresponding to the specified pixel contained in the edge part of the image data are adjusted. Alternatively, or in addition to this, the amplitude and the pulse width of the part of the drive current corresponding to a specified pixel contained in the middle part of the image data may be adjusted in the same manner as that for the specified pixel contained in the edge part of the image data.

In the above-described embodiment, the width of the edge part of the image data is set to the width of one or two pixels. Alternatively, the width of the edge part of the image data may be set to the width of three or more pixels. Also in this case, it is preferable that the product of the pulse width and the amplitude of the part of the drive current corresponding to the specified pixel is approximately equal to the product of the pulse width and the amplitude of the part of the drive current corresponding to the normal pixel.

In the-above-described embodiment, the LD control circuit 23 generates the drive current using one current source 31*a*. Alternatively, for example, one current source that generates a threshold current and one current source that generates an additional current may be used to generate the drive current. In this case, a threshold current and an additional current may be stably generated separately and, accordingly, the drive current may be generated more stably.

In the above-described embodiment, the laser printer 1000 is used as the image forming apparatus of the invention. Alternatively, for example, as shown in FIG. 16, the image forming apparatus according to the invention may be a color printer 2000 including multiple photosensitive drums.

The color printer 2000 is a tandem full-color printer that forms a full-color image by superimposing four colors (black, cyan, magenta and yellow). The color printer 2000 includes a station for black (a photosensitive drum K1, a charging device K2, a developing device K4, a cleaning unit K5, and a transfer device K6), a station for cyan (a photosensitive drum C1, a charging device C2, a developing device C4, a cleaning unit C5, and a transfer device C6), a station for magenta (a photosensitive drum M1, a charging device M2, a developing device M4, a cleaning unit M5, and a transfer device M6), a station for yellow (a photosensitive drum Y1, a charging device Y2, a developing device Y4, a cleaning unit Y5, and a transfer device Y6), an optical scanning device 2010, a transfer belt 2080, and a fixing unit 2030.

Figure 16:
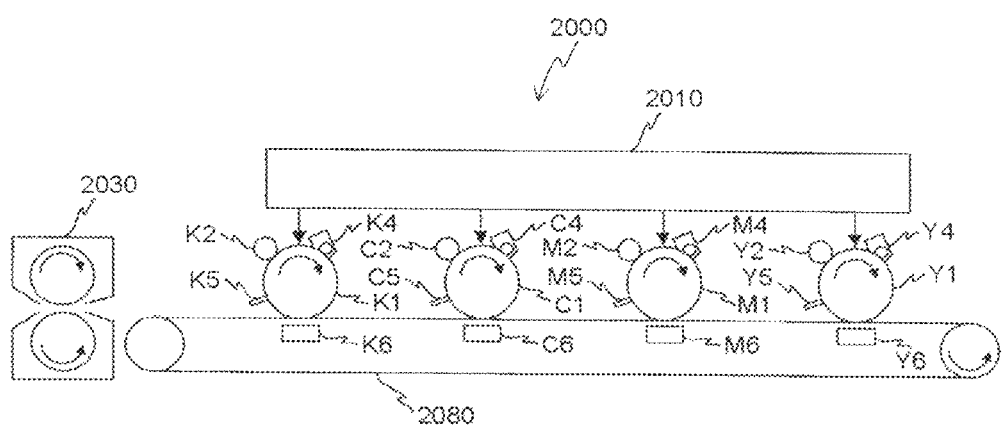
FIG. 16 shows a schematic configuration of a color printer.

The photosensitive drums rotate in the respective directions denoted by the arrows shown in FIG. 16 and a charging device, a developing device, a transfer device, and a cleaning unit are disposed around each of the photosensitive drums in the rotational direction. Each charging device uniformly charges the surface of the corresponding photosensitive drum. The optical scanning device 2010 exposes the drum surface of the charged photosensitive drum with laser light to form an electrostatic latent image on the photosensitive drum. The corresponding developing device forms a toner image on the surface of the photosensitive drum. Furthermore, the transfer devices transfer the toner images in the respective colors onto a recording paper sheet on the transfer belt 2080. Eventually, the fixing unit 2030 fixes the image on the recording paper sheet.

The optical scanning device 2010 includes, per color, the same type of LD as the LD 14 of the above-described embodiment and includes an LD control circuit that controls each LD and that has the same configuration as that of the LD control circuit 23. Accordingly, the same effects as those obtained with the optical scanning device 1010 can be obtained and occurrence of color shift can be controlled. Furthermore, because the color printer 2000 includes the optical scanning device 2010, the same effects as those obtained with the laser printer 1000 can be obtained.

The case has been described above where the optical scanning device is configured integrally with the color printer 2000. Alternatively, for example, an optical scanning device may be provided per image forming station or an optical scanning device may be provided for each set of two image forming stations.

The case has been described above where the color printer 2000 includes four photosensitive drums. Alternatively, for example, the color printer 2000 may include five or more photosensitive drums.

The image forming apparatus of the invention may be an image forming apparatus that emits laser light directly to a medium (e.g. a paper sheet) that colors with laser light.

The image forming apparatus of the invention may be an image forming apparatus using a silver halide film as an image bearer. In this case, a latent image is formed on the silver halide film by optical scanning and the latent image is visualized by the same processing as the developing processing of normal silver halide photographic processing. The visible image can be transferred onto a printing paper sheet by the same processing as the printing processing of normal silver halide photographic processing. Such an image forming apparatus can be implemented as an optical plate making device, and an optical drawing apparatus that draws CT scan images, and/or the like.

The present invention can be applied to, in addition to laser printers and color printers as described above, image forming apparatuses such as digital copying machines. In short, the present invention can be applied to image forming apparatuses generally that form an image by exposing an image bearer (e.g. photosensitive drum) with light from a light source to scan the image bearer.

Second Embodiment

An example different from the first embodiment will be described below. The example is the same as the first embodiment with respect to FIGS. 1 to 4 and accordingly redundant descriptions will be omitted here.

The specified pixel control unit 29*a*, controls (sets) a timing at which the LD 14 is turned on/off and the time during which the LD 14 is kept on to form a specified pixel and generates a light source modulation pulse signal. Here, "the timing at which the LD 14 is turned on/off to form a specified pixel" means the phase for the specified pixel with which the LD 14 is turned on when controlling the pulse width.

Figure 17A:
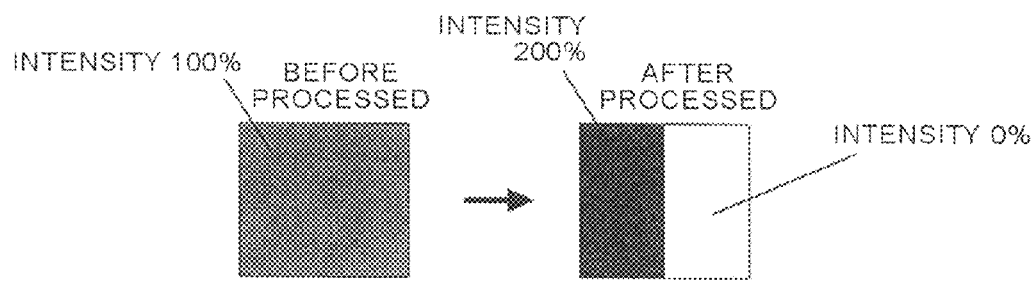
FIGS. 17A to 17C describe respective specific examples of processing for adjusting the time during which light is emitted and the intensity to be emitted to form a specific pixel.
Figure 17B:
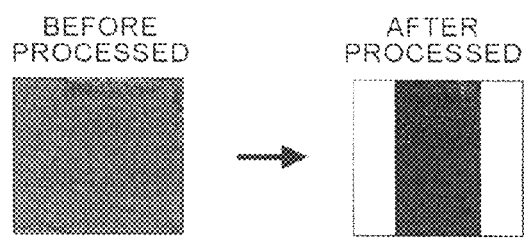
Figure 17C:
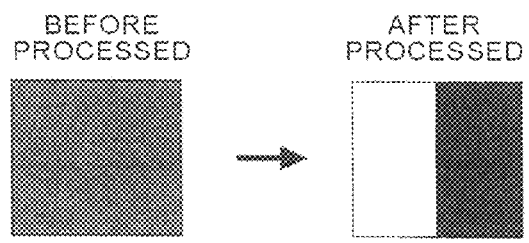

For example, FIG. 17A shows the states before and after the processing for, for the specified pixel, halving the pulse width (Duty) and setting the phase to the left phase. FIG. 17B shows the states before and after the processing for, for the specified pixel, halving the pulse width (Duty) and setting the phase to the center phase. FIG. 17C shows the states before and after the processing for, for the specified pixel, halving the pulse width (Duty) and setting the phase to the right phase.

The method of generating drive current data performed by the drive current data generation unit 29*e*, will be described here. The drive current data is a signal that is an instruction indicating which drive current value (pulse amplitude) is applied to the LD 14, i.e., what intensity is output.

First, normal intensity current data is read. Here, the "normal intensity current data" is data for determining a given intensity that is an intensity of a normal pixel. The "given intensity" means an intensity with which appropriate amount of toner to form a solid image by optically scanning the photosensitive drum 1030 can be obtained.

Power modulation intensity current data is then read. The "power modulation intensity current data" is data for determining what intensity corresponds to the specified pixel. The magnitude is set according to the normal intensity current data and, if the normal light quantity current data is changed, the power modulation intensity current data is accordingly adjusted.

For example, the power modulation intensity current data may be set to a value obtained by multiplying the normal intensity current data by an integer. The integer may be preferably determined according to the properties of the photosensitive drum, toner, development, and/or the like.

According to the pixel clock, the drive current data generation unit 29*e*, generates drive current data that serves as the power modulation intensity current data at the timing for the specified pixel and serves as the normal intensity current data at the timing for the normal pixel.

In the embodiment, as described below using a specific example, given processing (processing for adjusting the time during which light is emitted and the intensity to be emitted) is performed on the edge part of the image data.

Figure 18A:
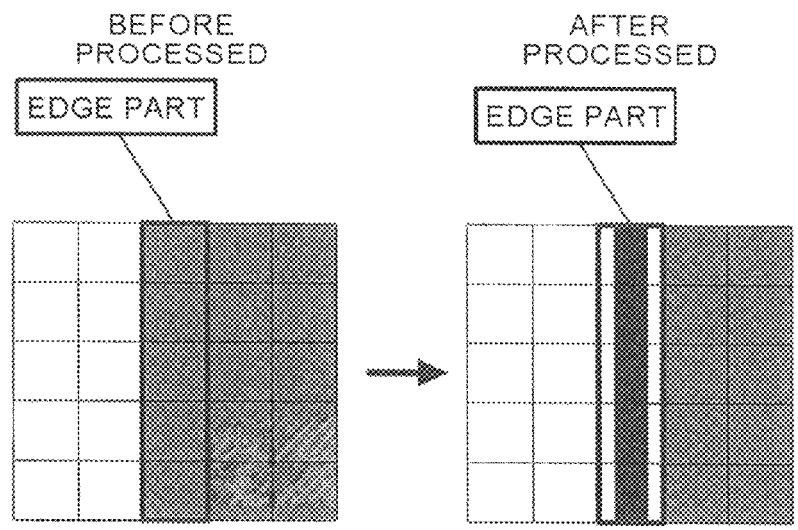
FIGS. 18A and 18B describe respective specific examples of processing for adjusting the time during which light is emitted and the intensity to be emitted for the edge part of an image.
Figure 18B:
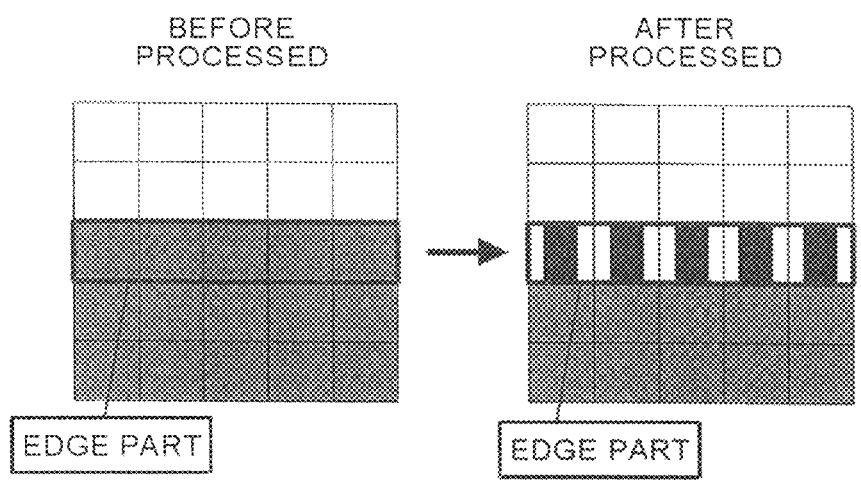

Exemplary processing on multiple specified pixels constituting each of the edge parts of the image data in the main-scanning direction and the sub-scanning direction is shown in FIG. 18A and FIG. 18B. FIG. 18A shows the enlarged area containing the edge part of the image data in the main-scanning direction. FIG. 18B shows the enlarged area containing the edge part of the image data in the sub-scanning direction.

Here, the width of each specified pixel in the main-scanning direction is reduced and the LD 14 emits light with an intensity (emission intensity) larger than a normal intensity. Specifically, the width of each specified pixel is set to a half of the width of the normal pixel and the intensity for each specified pixel is set to 200% of the intensity for the normal pixel. The phase of each specified pixel is the center phase.

Figure 19A:
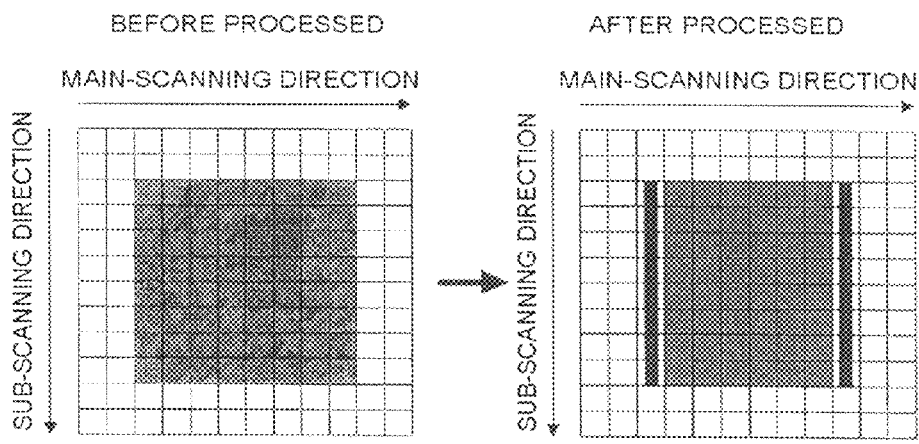
FIGS. 19A and 19B describe respective specific examples of processing for adjusting the time during which light is emitted and the intensity to be emitted for the edge part of a solid image.
Figure 19B:
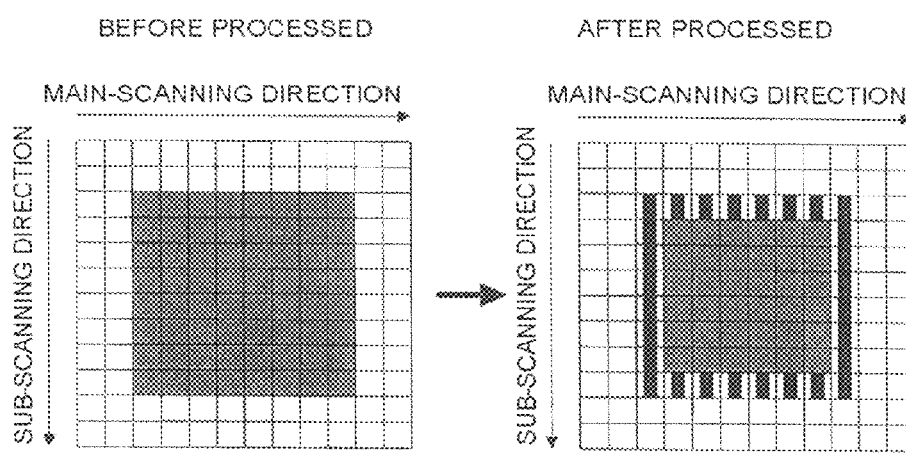

FIGS. 19A and 19B show a specific example of image data (e.g. a solid image) before and after being processed. FIG. 19A represents that the processing is performed only on the edge part in the main-scanning direction, and FIG. 19B represents that the processing is performed on both the edge parts in the main-scanning and sub-scanning directions.

Figure 20A:
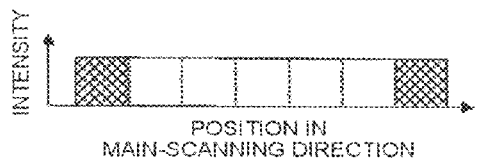
FIGS. 20A to 20D describe respective specific examples of processing for adjusting the time during which light is emitted and the intensity to be emitted for one pixel of the edge part of an image in the main-scanning direction.

FIG. 20A shows the optical waveform in a case where processing is not performed on the edge part in the main-scanning direction.

Figure 20B:
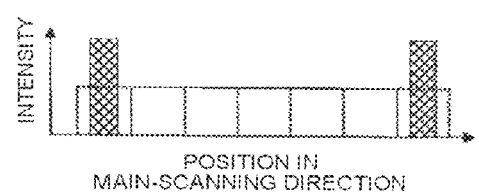

FIG. 20B shows the optical waveform obtained when the processing is performed on the edge part (corresponding to one specified pixel) in the main-scanning direction. The hatched part represents the edge part. FIG. 20B shows that the specified pixel of the edge part is formed with a Duty of 50% and 200% of the normal intensity. The phase is a center phase.

Figure 20C:
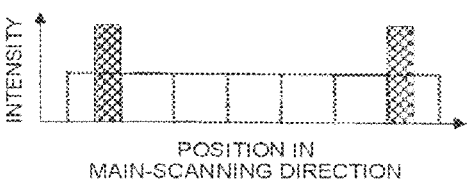

FIG. 20C represents the optical waveform obtained by shifting the phase shown in FIG. 20B toward the center of the image. In this case, because there is no off time in the middle of the image data, the area of a weak electric field where toner attachment is unstable can be reduced.

Figure 20D:
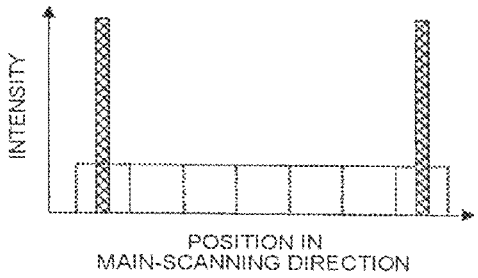

FIG. 20D represents a state where the specified pixel of the edge part in the main-scanning direction is formed with a Duty of 25% and 400% of the normal quantity of light. In this case, because the edge part is further enhanced, toner scattering can be prevented, the sharpness can be increased, and the density can be stabilized.

Figure 21A:
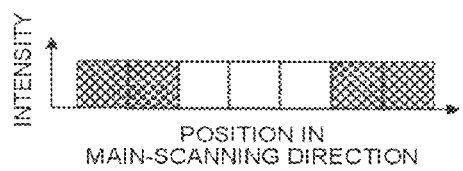
FIGS. 21A to 21D describe respective specific examples of processing for adjusting the time during which light is emitted and the intensity to be emitted for two pixels of the edge part of an image in the main-scanning direction.

FIG. 21A shows the optical waveform in a case where processing is not performed on the edge part in the main-scanning direction.

Figure 21B:

FIG. 21B shows the optical waveform obtained when the processing is performed on the edge part (corresponding to two specified pixels) in the main-scanning direction. The hatched part represents the edge part. FIG. 21B shows that the specified pixel of the edge part is formed with a Duty of 50% and 200% of the normal quantity of light. The phase is a center phase.

Figure 21C:
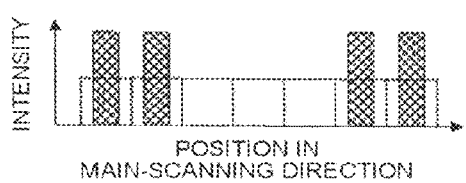

FIG. 21C shows the optical waveform obtained by shifting the phase shown in FIG. 21B to the center of each specified pixel of the edge part.

Figure 21D:
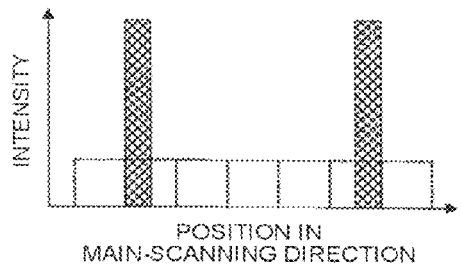

FIG. 21D shows the optical waveform obtained when the processing is performed on the pixels of the edge part (the second pixel from one end and the second pixel from the other end in the main-scanning direction) is formed with a Duty of 25% and 400% of the normal intensity. In this case, because the edge part is further enhanced, toner scattering can be prevented, the sharpness can be increased, and the density can be stabilized.

The laser printer 1000 according to the above-described embodiment is an image forming apparatus that forms an image by scanning the photosensitive drum 1030 with light that is modulated according to the image data (image information). The laser printer 1000 includes the LD 14 and the scanning control device 15 that controls the LD 14 according to the image data. The scanning control device 15 sets the time during which the LD 14 emits light (pulse width) to form a specified pixel of the image, to a time shorter than the time during which the LD 14 emits light (pulse width) to form a normal pixel of the image that is a pixel other than the specified pixel and sets the intensity of the LD 14 to form the specified pixel (pulse amplitude), to an amount larger than the intensity of the LD 14 (pulse amplitude) to form the normal pixel.

In other words, the image forming method using the laser printer 1000 according to the embodiment is an image forming method to form an image by scanning the photosensitive drum 1030 with light that is modulated according to image data, wherein the time during which the light is emitted to form a specified pixel of the image is shorter than the time during which the light is emitted to form a normal pixel of the image that is a pixel other than the specified pixel and the intensity to form the specified pixel is larger than the intensity to form the normal pixel.

As a result, the laser printer 1000 and the image forming method using the laser printer 1000 can prevent occurrence of density unevenness in the formed image.

The specific example of the operations of the laser printer 1000 according to the embodiment is as described using FIGS. 14 and 15.

According to the embodiment, as described above, the product of the intensity of the LD 14 and the time during which the LD 14 emits light to form the specified pixel is approximately equal to the product of the intensity of the LD 14 and the time during which the LD 14 emits light to form the normal pixel, i.e., the product of the time during which light is emitted and the intensity to form the specified pixel is approximately equal to the product of the time during which light is emitted and the intensity to form the normal pixel, which can keep the exposure energy constant.

The specified pixel is a pixel contained in the edge part of the image, which can increase the sharpness of the edge part.

The laser printer 1000 further includes the optical scanning device 1010 that scans the photosensitive drum 1030 in the main-scanning direction with the light from the LD 14 and the edge part is the edge part of the image in the main-scanning direction.

In this case, occurrence of density unevenness due to change of the developing electric field on the photosensitive drum 1030 in the main-scanning direction can be controlled.

The magnitude of the current supplied to the LD 14 to form the specified pixel is preferably obtained by multiplying the current supplied to the LD 14 to form the normal pixel by N (>1), for example, preferably by an integer equal to or larger than 2. Furthermore, a time during which the current is supplied to the LD 14 (the pulse width of the current pulse) is preferably set such that the product of the intensity of the LD 14 and the time during which the LD 14 emits light is approximately equal to each other between the case of forming the specified pixel and the case of forming the normal pixel.

According to the embodiment, the pulse width and the pulse amplitude of the light source modulation pule signal are adjusted for the specified pixel contained in the edge part of the image. Alternatively, or in addition to this, the pulse width and the pulse amplitude of the light source modulation pulse signal may be adjusted for the specified pixel contained in the middle part of the image in the same manner as that of the adjustment on the edge part.

In the above-described embodiment, the width of the edge part of the image is set to the width of one or two pixels. Alternatively, the width of the edge part of the image may be set to the width of three or more pixels.

In the above-described embodiment, the light source control circuit 23 includes the light source modulation data generation unit 29. Alternatively, the image processing unit may include the light source modulation data generation unit 29. In this case, the light source control circuit may include only the light source drive unit 31.

In the above-described embodiment, the laser printer 1000 is used as the image forming apparatus of the invention. Alternatively, for example, as shown in FIG. 12, the image forming apparatus of the invention may be the color printer 2000 including multiple photosensitive drums as shown in FIG. 12.

The image forming apparatus of the invention may be an image forming apparatus that emits laser light directly onto a medium (e.g. a paper sheet) that colors with laser light.

The image forming apparatus of the invention may be an image forming apparatus using a silver halide film as an image bearer. In this case, a latent image is formed on the silver halide film by optical scanning and the latent image can be visualized by the same processing as the developing processing of normal silver halide photographic processing. The visible image can be transferred onto a printing paper sheet by the same processing as the printing processing of normal silver halide photographic processing. Such an image forming apparatus can be implemented as an optical plate making device or an optical drawing apparatus that draws CT scan images and/or the like.

The present invention can be applied to, in addition to laser printers and color printers as described above, image forming apparatuses such as digital copying machines. In short, the present invention can be applied to image forming apparatuses generally that form an image by exposing an image bearer (e.g. photosensitive drum) with light that is modulated according to image information to scan the image bearer.

An aspect of the present invention provides an effect that occurrence of density unevenness in a formed image can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image forming apparatus comprising:
a light source; and
circuitry configured to supply a pulse drive current according to image data to the light source, wherein
an amplitude of a part of the pulse drive current corresponding to a specified pixel of the image data is larger than an amplitude of a part of the pulse drive current corresponding to a normal pixel of the image data that is a pixel other than the specified pixel,
a pulse width of the part of the pulse drive current corresponding to the specified pixel is smaller than a pulse width of the part of the pulse drive current corresponding to the normal pixel,
the light source is a semiconductor laser,
the amplitude of the part of the pulse drive current corresponding to the normal pixel is a value obtained by summing a threshold current of the semiconductor laser and an additional current, and
the amplitude of the part of the pulse drive current corresponding to the specified pixel is a value obtained by summing the threshold current and a value obtained by multiplying the additional current by a given value N (N>1).

2. The image forming apparatus according to claim 1, wherein the specified pixel is a pixel contained in an edge part of the image data.

3. The image forming apparatus according to claim 1, wherein the circuitry is configured to adjust a phase of the part of the pulse drive current corresponding to the specified pixel.

4. The image forming apparatus according to claim 1, wherein the circuitry is configured to detect the specified pixel according to an attribute of the image data.

5. The image forming apparatus according to claim 4, wherein the attribute of the image data include at least one of a letter, a photo, and a diagram.

6. The image forming apparatus according to claim 1, wherein a ratio of the pulse width of the part of the pulse drive current corresponding to the specified pixel to the pulse width of the part of the pulse drive current corresponding to the normal pixel is set according to the given value N (N>1).

7. The image forming apparatus according to claim 6, wherein the ratio is approximately 1/N.

8. The image forming apparatus according to claim 1, wherein the circuitry is configured to adjust the additional current according to a result of detection performed by an optical detector that detects light from the semiconductor laser.

9. The image forming apparatus according to claim 1, wherein the threshold current and the additional current are generated using respective current sources that are different from each other.

10. The image forming apparatus according to claim 1, wherein the semiconductor laser is a surface emitting laser.

11. The image forming apparatus according to claim 1, wherein the given value N (N>1) is determined based on properties of at least one of a photosensitive drum, toner, and development.

12. An image forming method of forming an image by scanning an image bearer with light from a light source, the image forming method comprising:
supplying a pulse drive current according to image data to the light source, wherein
an amplitude of a part of the pulse drive current corresponding to a specified pixel of the image data is larger than an amplitude of a part of the pulse drive current corresponding to a normal pixel of the image data that is a pixel other than the specified pixel,
a pulse width of the part of the pulse drive current corresponding to the specified pixel is smaller than a pulse width of the part of the pulse drive current corresponding to the normal pixel,
the light source is a semiconductor laser,
the amplitude of the part of the pulse drive current corresponding to the normal pixel is a value obtained by summing a threshold current of the semiconductor laser and an additional current, and
the amplitude of the part of the pulse drive current corresponding to the specified pixel is a value obtained by summing the threshold current and a value obtained by multiplying the additional current by a given value N (N>1).

13. An image forming apparatus comprising:
a light source; and
circuitry configured to control the light source according to image information, wherein
the circuitry is configured to cause a time during which the light source emits light to form a specified pixel of an image to be shorter than a time during which the light source emits light to form a normal pixel of the image that is a pixel other than the specified pixel,
the circuitry is configured to cause an intensity of the light source to form the specified pixel to be larger than an intensity of the light source to form the normal pixel,
the light source is a semiconductor laser,
the intensity of the light source to form the normal pixel is a value obtained by summing a threshold current of the semiconductor laser and an additional current, and
the intensity of the light source to form the specified pixel is a value obtained by summing the threshold current and a value obtained by multiplying the additional current by a given value N (N>1).

14. The image forming apparatus according to claim 13, wherein a product of the intensity of the light source to form the specified pixel and the time during which the light source emits light to form the specified pixel is approximately equal to a product of the intensity of the light source to form the normal pixel and the time during which the light source emits light to form the normal pixel.

15. The image forming apparatus according to claim 13, wherein the specified pixel is a pixel contained in an edge part of the image.

16. The image forming apparatus according to claim 15, wherein the edge part is an edge part of the image in a main-scanning direction.

17. The image forming apparatus according to claim 13, wherein the specified pixel is detected according to an attribute of the image information.

18. The image forming apparatus according to claim 13, wherein a current supplied to the light source to form the specified pixel is obtained by multiplying a current supplied to the light source to form the normal pixel by the given value N (N>1).

19. The image forming apparatus according to claim 13, wherein the light source includes a surface emitting laser.

* * * * *